United States Patent Office 3,533,974
Patented Oct. 13, 1970

3,533,974
**POLYVINYL CHLORIDE POLYESTER PLASTI-
CIZERS HAVING PENDANT ALKYL GROUPS**
Edmund Paul Pultinas, Jr., Cincinnati, Ohio, assignor
to The Procter & Gamble Company, Cincinnati, Ohio,
a corporation of Ohio
No Drawing. Continuation-in-part of application Ser. No.
675,032, Oct. 13, 1967. This application Sept. 25, 1968,
Ser. No. 762,657
Int. Cl. C08g *17/16, 17/18*
U.S. Cl. 260—22          13 Claims

ABSTRACT OF THE DISCLOSURE

A nonvolatile polyester plasticizer for polyvinyl chloride, having pendant alkyl groups on the polyester chain and imparting improved low temperature properties to the plasticized polymer composition.

REFERENCE TO RELATED APPLICATION

This application is a continuation-in-part of my copending application Ser. No. 675,032, filed Oct. 13, 1967, now abandoned, for Polyvinyl Chloride Polyester Plasticizers Having Pendant Alkyl Groups.

BACKGROUND OF THE INVENTION

It is known in plastics technology that permanence of a plasticized polyvinyl chloride polymer composition is generally a function of the molecular weight of the plasticizer; thus the higher the molecular weight of the plasticizer, the greater the permanence of the plasticized composition. Permanence as used herein refers to the ability of a plasticized polymer composition to resist decomposition by heat and solvent extraction; thus a polymer composition containing a nonvolatile, nonextractable plasticizer would have good permanence properties and conversely a polymer composition containing an easily extractable, volatile plasticizer would have poor permanence properties. If the molecular weight of the plasticizer becomes too high, there is a marked reduction in low temperature flexibility of the plasticized polyvinyl chloride which is undesirable. Therefore, those skilled in the art of plastics technology have been met with the problem of having to compromise either good low temperature flexibility or good permanence properties of the plasticized polyvinyl chloride. Up to now, maximum permanence properties and maximum low temperature properties were not possible in the same polyvinyl chloride polymer composition; one had to be sacrificed for the benefit of the other. For example, if good low temperature flexibility was desired a low molecular weight polyester plasticizer was used, but the use of this low molecular weight plasticizer resulted in some loss of permanence properties.

SUMMARY OF THE INVENTION

This invention relates to a polyester having a molecular weight from about 800 to about 4000 which is a reaction product of (1) dibasic acid having from 6 to 13 carbon atoms, (2) a diol mixture comprising (a) an epoxide compound having the formula $$RCH\underset{O}{-}CH_2$$

wherein R is selected from the group consisting of alkyl groups containing from 4 to 16 carbon atoms and groups having the formula R′—O—CH$_2$— wherein R′ is an alkyl or acyl group containing from 4 to 16 carbon atoms and (b) an aliphatic dihydroxy alcohol having from 2 to 6 carbon atoms and (3) a fatty acid or fatty alcohol terminator said terminators containing from 2 to 22 carbon atoms, there being 0 to about 150 mole percent excess of either component (1) or component (2) over the amounts required for the reaction and at least a stoichiometric amount of the terminator which is an alcohol when excess dibasic acid is used and a fatty acid when excess diol mixture is used.

Such a low molecular weight polyester plasticizer can be used to plasticize polyvinyl chloride without loss of permanence. It is theorized that this result is obtained because of the pendant alkyl groups. These plasticizers, although having a relatively low molecular weight have a dramatic and surprising permanence in the resulting plasticized polyvinyl chloride composition. Consequently, it is now possible to have a plasticized polyvinyl chloride composition that has both good low temperature flexibility and good permanence properties. Typical of the many commercial uses of a good-permanence, low-molecular-weight-plasticized polyvinyl chloride are flexible films, automobile seat covers, wire and cable coatings, and gaskets.

DETAILED DESCRIPTION OF THE INVENTION

Because of the complexity of a polymerizing reaction, especially in a four component system such as applicant uses, it is impossible to describe the resulting polyester by an exact chemical formula; therefore, the polyesters have been described in reaction product terms. While not wanting to be bound by any theory, it is believed that a least part of the resulting polyester can be described by the following exemplary schematic representation. In the diagram "AA" represents adipic acid;

represent an alkyl glycidyl ether or olefin oxide; "PG" represents propylene glycol and "FA" represents a fatty acid terminator. Using the designated symbols an exemplary form of the polyester can be represented as follows:

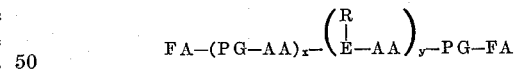

where $x$ represents the number of repeating propylene glycol-adipic acid units and $y$ represents the number of repeating alkyl glycidyl ether (or olefin oxide)—adipic acid units. R represents the pendant alkyl group of C$_4$ to C$_{16}$, preferably C$_8$ to C$_{14}$, which as can be seen from the diagram is attached to the polyester backbone as a side chain. It is the periodic placement of these pendant alkyl groups along the polyester chain which imparts good low temperature and good permanence properties to the plasticized vinyl chloride composition.

The polyester itself is prepared by using conditions (described below) which will allow the resulting polymer to have a molecular weight of from about 800 to about 4000, preferably from about 1000 to about 3000. If the reaction is terminated so that the polyester has a molecular weight less than 800, the plasticized composition has comparatively poor permanence properties; on the other hand, if the polyester has a molecular weight of over 4000, the polyester is very viscous and compatibility with the polyvinyl chloride decreased.

The polyesters of this invention are a reaction product of (1) dibasic acids having 6 to 13 carbon atoms, preferably 6 to 9 carbon atoms, (e.g., adipic acid); (2) $C_4$ to $C_6$ (preferably $C_8$ to $C_{14}$) alkyl glycidyl ethers (e.g., n-octyl and n-decyl glycidyl ethers), glycidyl esters containing $C_4$ to $C_{16}$ (preferably $C_8$ to $C_{14}$) acyl moieties, and/or $C_6$ to $C_{18}$ (preferably $C_{10}$ to $C_{16}$) olefin oxides and, if desired, a $C_2$ to $C_6$ (preferably $C_2$ to $C_4$) diol (e.g., propylene glycol). The polymerizing reaction is terminated with a $C_2$ to $C_{22}$ (preferably $C_4$ to $C_8$) fatty acid or fatty alcohol such as n-octanoic acid or n-octanol.

The polymerizing reaction between the dibasic acid and the diol mixture can be conducted in any suitable reaction vessel at temperatures ranging from about 150° C. to about 250° C. (preferably from about 180° C. to about 220° C.) and for a time of from about one to about 48 hours (preferably from about 5 to about 6 hours, depending on the temperature). To produce the most effective polyester plasticizers certain other reaction conditions must be maintained. First, the amount of epoxide used should be from about 10 to about 100 mole percent of the diol mixture (preferably from about 20 to about 50 mole percent of the diol mixture and most preferably from about 25 to about 33 mole percent of the stoichiometric amount required to completely react with the dibasic acid). Secondly, either the dibasic acid or the diol mixture should be used in an excess up to about 150% of the stoichiometric amounts (preferably from about 10 to about 50 mole percent excess). This insures complete reaction and is therefore desirable. The amount of fatty acid or fatty alcohol terminator used is dependent upon the desired molecular weight of the polyester polymer. For example, if a high molecular weight polyester is desired, less mole percent of the terminator is used. This will have the effect of decreasing the number of polymer molecules but increasing the average molecular weight of each molecule. On the other hand, if a lower molecular weight polyester is desired a higher mole percent of terminator is used. This has the effect of terminating the polymerizing reaction at more places and consequently produces more polymer molecules of smaller molecular weight. To produce polymer molecules within the 800 to 4000 and the preferred 2000 to 4000 molecular weight range, from about 6 to about 26 mole percent of the acid portion of the polyester of fatty acid terminator and from about 6 to about 26 mole percent of the alcohol portion of the polyester of fatty alcohol terminator are used.

Any dibasic acid having from 6 to 13, preferably 6 to 9, carbon atoms can be used in preparing the polyesters of this invention; for example, adipic acid, phthalic acid, isophthalic acid, terephthalic acid, phthalic anhydride, pimelic acid, suberic acid, azelaic acid, and brassylic acid.

Alkyl glycidyl ethers which can be used to attach a pendant alkyl group include n-butyl glycidyl ether, n-hexyl glycidyl ether, n-heptyl glycidyl ether, n-octyl glycidyl ether, n-nonyl glycidyl ether, n-decyl glycidyl ether, n-dodecyl glycidyl ether, n-hexadecyl glycidyl ether and n-tetradecyl glycidyl ether. Olefin oxides which can be used to attach pendant alkyl group include hexylene oxide, heptylene oxide, octylene oxide, nonylene oxide, decylene oxide, dodecylene oxide, dodecylene oxide, tetradecylene oxide, and hexadecylene oxide. Glycidyl esters which can be used to attach a pendant alkyl group are glycidyl butanoate, glycidyl pentanoate, glycidyl hexanoate, glycidyl heptanoate, glycidyl octanoate, glycidyl decanoate, glycidyl undecanoate, glycidyl dodecanoate, glycidyl tetradecanoate and glycidyl hexadecanoate. Mixtures of the glycidyl ethers, glycidyl esters and/or the olefin oxides can be used. Glycidyl ethers are preferred.

Glycols which can be used to prepare the polyesters of this invention are ethylene glycol, propylene glycol, 1,3 butylene glyocl, 2,3 butylene glycol, 2-methyl-2,4-pentane diol, 1,6-hexane dial, and 1,4 butylene glycol.

Fatty acid and fatty alcohol terminators can be selected from any of those fatty acids and fatty alcohols which provide the reaction termination effect. There are many fatty acids and fatty alcohols which will act as suitable reaction terminators. A preferred class are the monobasic saturated fatty acids and monohydroxy fatty alcohols containing from 2 to 22 carbon atoms. Satisfactory results can be achieved with acetic acid, butyric acid, valeric acid, caproic acid, caprylic acid, lauric acid, myristic acid, palmitic acid and steari acid. The same termination effect can be achieved by using the acid chlorides and anhydrides of the above mentioned fatty acids and as used herein the term "fatty acid terminator" includes the corresponding acid anhydrides and acid chlorides. Fatty alcohols which can be used inculde ethanol, butanol, hexanol, heptanol, octanol, nonanol, decanol, dodecanol, tetradecanol, hexadecanol, octadecanol, and eicosanol. It is preferred to have an excess of the diol in the reaction mixture and terminate with a fatty acid terminator.

The resulting polyester reaction products can be incorporated in polyvinyl chloride resin on the basis of 35 to 100 parts of polyester plasticizer per hundred of polyvinyl chloride.

Although the invention has been described hereinafter particularly with reference to plasticization of a Geon 101, a homopolymer of polyvinyl chloride, the plasticizers are also advantageously employed as plasticizers for copolymers of vinyl chloride, for example, the copolymers of vinyl chloride with vinyl acetate or vinylidene chloride. Preferably such copolymers have a high vinyl chloride content.

The vinyl chloride polymers employed can have a molecular weight within the range from about 10,000 to 500,000. The preferred polymers used in the preparation of the plastic are those having a molecular weight as measured by the Staudinger method described in Industrial and Engineering Chemistry, volume 36, page 1152 (1936), of at least 15,000 and preferably above 20,000, up to 400,000. Commercial grades of vinyl chloride polymers having a molecular weight between 100,000 and 200,000 are especially suited for use in the plastic compositions described herein.

For laboratory samples the polyester and the polyvinyl chloride were blended by simple mixing procedures; however, when producing large quantities of the plasticized composition the materials can be dry blended by conventional mixing procedures and heating for a short period of time at about 60° C. The blended mixture can then be processed by conventional procedure to form a plasticized compostiion.

The following examples are offered to illustrate the preparation and the properties of the polyesters of this invention and the resulting polyvinyl chloride compositions plasticized with polyesters having pendant alkyl groups of $C_4$ to $C_{16}$ on the polyester chain.

EXAMPLE I

In one method of preparing the polyester plasticizer, one mole of adipic acid was reacted with 0.25 mole of a mixture of n-hexyl, n-octyl, and n-decyl glycidyl ethers (approximately 7% $C_6$, 53% $C_8$, and 40% $C_{10}$) and 1.10 moles of propylene glycol. The ratio of $C_8$ to $C_{10}$ in the ether was about 1.4 to 1. The reaction was carried out at a temperature of 170° C. for 3 hours and allowed to continue until the acid value of the product was 4.5. The remaining hydroxyl groups were then esterified with 0.22 mole of octanoic acid at 180° C. The average molecular weight of the polyester was about 2300. The polyester was incorporated into Geon 101,, a commercial homopolymer of polyvinyl chloride, at 50 parts per hundred of resin. The plasticized composition is referred to in Table I as Sample I.

EXAMPLE II

In a second method of preparing the polyester plasticizer, 4 moles of adipic acid was reacted with 1.09 moles of a mixture of n-hexyl, n-octyl and n-decyl glycidyl ethers (approximately 7% $C_6$, 53% $C_8$ and 40% $C_{10}$) and .83 mole of octanoic acid in the presence of 1.2 grams of anhydrous zinc chloride catalyst. This reaction was carried out at about 180° C. for about ¾ of an hour and then 6.6 moles of ethylene glycol was added. The reaction was continued at a temperature which ranged between 180° and 220° C. for about 2½ hours at atmospheric pressure. After this time the pressure was reduced to about 5 mm. at 220° C. and the excess ethylene glycol was removed. This took about 2 hours. The acid value was then reduced to about 1. The average molecular weight of the resulting polyester was about 1,750. The polyester was incorporated into Geon 101, at 50 parts per hundred of resin. This plasticized composition is referred to in Table I as Sample II.

EXAMPLE III

In a third method of preparing the polyester plasticizer, a mixture of 3.2 moles of adipic acid and .8 mole of phthalic anhydride were reacted with 1.9 moles of the glycidyl ethers of Example II and .88 mole of octanoic acid in the presence of 1.2 grams of zinc chloride catalyst. This reaction was carried out at 180° C. for about ¾ of an hour. At this time, 6.6 moles of propylene glycol were added to the reaction mixture and the reaction was continued for about 2½ hours at atmospheric pressure and at a temperature which ranged from between 180° and 220° C. At this time the pressure was reduced to about 5 mm. and the excess glycol was removed at a temperature of about 220° C. This removal took about two hours. At this time the acid value was reduced to about 2. The average molecular weight of the resulting polyester was about 1300. The polyester was incorporated into Geon 101 at 50 parts per hundred of resin. This plasticized compostion is referred to in Table I as Sample III.

EXAMPLE IV

In a fourth method of preparing the polyester plasticizer, four moles of adipic acid were reacted with 1.1 mole of the glycidyl ether of Example II and .93 mole of octanoic acid in the presence of 1.2 grams of anhydrous zinc chloride catalyst. This reaction was carried out at about 180° C. for about ¾ of an hour. At this time, 6.72 moles of propylene glycol were added and the reaction was continued for 2½ hours at 180° to 220° C. at atmospheric pressure. At this time, the pressure was reduced to about 5 mm. and excess glycol was removed at 220° C. This removal took about 2 hours. At this time the acid value was reduced to about 1.4. The average molecular weight of the resulting polyester was about 1600. The polyester was incorporated into the Geon 101 at 50 parts per hundred of resin. This plasticized composition is referred to in Table I as Sample IV.

EXAMPLE V

In a fifth method of preparing the polyester plasticizer 4.5 moles of adipic acid was reacted with 1.5 moles of $C_8$–$C_{10}$ alkyl glycidyl ethers and 4.5 moles of propylene glycol. 1.0 mole of n-octanoic acid was used as the fatty acid terminator. The reaction was carried out at 185–200° C. and for about 4 hours. The polyester was incorporated into Geon 101, a polyvinyl chloride homopolymer, at 50 parts per hundred of resin. The other conditions and proportions were identical with those described in the first example. The average molecular weight of the resulting polyester was about 2200. This plasticized composition is referred to in Table I as Sample V.

TESTS

In evaluating the polyvinyl chloride plasticizers use was made of the following testing procedures:

Carbon volatility

As a measure of the permanence properties of a plasticizer, the plasticized resin is weighed, immersed in carbon black, heated to a designated temperature for a given period of time, then cooled and reweighed. If the loss in weight is high, the permanence of the plasticizer is poor and the plasticized composition becomes very stiff and hard.

Solvent extraction

This is another measure of the permanence properties of a plasticizer. The weighed plasticized polymer is submerged in a given solvent for a definite time and then dried and reweighed. The measure of weight loss is a measure of the plasticizer permanence properties. The particular solvents used were soapy water and hexane.

Low temperature flexibility

One of the more important properties of a plasticized polyvinyl chloride composition is its ability to remain flexible at low temperatures. Many plasticizers will produce flexible compostions at room temperature but at low temperatures the plasticized polyvinyl chloride composition becomes very brittle and useless. The temperature at which the polyvinyl chloride composition reaches an arbitrarily established minimum flexibility is recorded. Thus the lower the temperature to reach the standard minimum flexibility, the greater the low temperature flexibility properties of the plasticized polyvinyl chloride composition. The minimum flexibility is measured by applying a uniform torsional force measured in pounds per square inch. The temperature at which the sample is twisted to a given angle is recorded.

Tensile properties

The 100% modulus is a measure of the pounds per square inch of force necessary to stretch the sample to exactly twice its original length. The test is run at a constant temperature. The higher the force required, the poorer the flexibility of the plasticized polyvinyl chloride composition.

In the following table showing the results of the evaluation tests, Samples I, II, III, IV and V are the samples refrerred to and prepared in accordance with the directions of Examples I throughV. "Product 6" referes to a plasticized composition using a commercial plasticizer, Paraplex G–40, of relatively high molecular weight prepared from adipic acid, propylene glycol and fatty acid terminator. It has an average molecular weight of about 4700 and was incorporated at 50 parts per hundred of resin. It is included for comparsion purposes only.

"Product 7" refers to a plasticized composition using a commercial plasticizer, Paraplex G–41, of very high molecular weight prepared from adipic acid, propylene glycol and fatty acid terminator. It was incorporated at 50 parts per hundred of resin and had an average molecular weight of 5000. It is included for comparison purposes only.

The polyesters referred to in Samples I–V all have pendant alkyl groups of $C_8$–$C_{14}$ whereas products 6 and 7 do not. All of the polyester plasticizers were incorporated with the polyvinyl chloride homopolymer by simply placing them together, thoroughly mixing and then heating the mixture to about 350–400° F. until the PVC melts. The resulting plasticized resin composition may be extruded, milled or molded into any desired form.

TABLE I

| | I | II | III | IV | V | Product 6 | Product 7 |
|---|---|---|---|---|---|---|---|
| Polyester Mol. Wt. | 2,300 | 1,750 | 1,300 | 1,600 | 2,200 | 4,700 | 5,000 |
| Low temperature properties: | | | | | | | |
| T 10,000, °C | 5 | 6 | 13 | 8 | +2 | 12 | 9 |
| T 100,000, °C | −20 | −24 | −11 | −23 | −27 | −7.5 | −10 |
| Tensile Properties, p.s.i., | | | | | | | |
| 100% Modulus | 1,880 | 1,820 | 2,100 | 1,740 | 1,580 | 1,990 | 2,100 |
| Extractions, percent: | | | | | | | |
| Hexane | 0.2 | 1.8 | 0.3 | 3.7 | 4.1 | 0.0 | 0.1 |
| Soapy H²O | 1.5 | 4.5 | 2.3 | 3.4 | 1.5 | 2.1 | 2.6 |
| Carbon volatility | 2.1 | 3.4 | 2.0 | 3.1 | 4.0 | 1.9 | 1.6 |

Because of the low molecular weight of the plasticizers of Samples I–V, good low temperature flexiblity was expected and the data in the table showes this. However, as can be seen from the data, polyesters I, II, III, IV, and V exhibit permanence properties about equal to those of Products 6 and 7 and yet Products 6 and 7 are from two to four times heavier in average molecular weight and have relatively poor low temperature properties. The surprising effect of the pendant alkyl group in greatly increasing the permanence properties of a low molecular weight plasticizer composition is apparent. The only samples imparting both good permanence and low temperature properties to the plasticized polyvinyl chloride composition are Samples I, II, III, IV, and V all of which have pedant alkyl groups of $C_8$ to $C_{14}$.

When in the above examples, the following acids are substituted, either wholly or in part (e.g., a 1:1 ratio), for adipic acid on an equal molar basis, substantially equivalent results are obtained in that polyester plasticizers are prepared which have improved low temperature properties and good permanance properties when used in the polyvinyl chloride resin of Example I at a level of 50 parts per hundred of resin: isophthalic acid, terephthalic acid, phthalic anhydride, pimelic acid, suberic acid, azelaic acid, sebacic acid, and brassylic acid.

When in the above examples the following glycidyl ethers and olefin oxides are substituted, either wholly or in part (e.g., a 1:1 ratio) for the specific glycidyl ethers on an equal molar basis, substantially equivalent results are obtained in that polyester plasticizers are prepared which have improved low temperature properties and good permanence properties in the vinyl chloride resin of Example I when used at a level of 50 parts per hundred of resin: n-butyl glycidyl ether, n-heptyl glycidyl ether, n-nonyl glycidyl ether, n-undecyl glycidyl ether, n-hexadecyl glycidyl ether, heptylene oxide, ortylene oxide, nonylene oxide, decylene oxide, dodecylene oxide, decylene oxide, tetradecylene oxide, and hexadecylene oxide, glycidyl butanoate, glycidyl pentanoate, glycidyl hexanoate, glycidyl heptanoate, glycidyl octanoate, glycidyl decanoate, glycidyl undecanoate, glycidyl dodecanoate, glycidyl tetradecanoate, and glycidyl hexadecanoate.

When in the above examples the following diols are substituted, either wholly or in part (e.g., a 1:1 ratio) for the propylene glycol or ethylene glycol on an equal molar basis, substantially equivalent results are obtained in that polyester plasticizers are prepared which have improved low temperature properties and good permanence properties when used in the polyvinyl chloride resin of Example I at a level of 50 parts per hundred of resin: 1,3-butylene glycol, 2,3-butylene glycol, 1,4-butylene glycol, 2-methyl-2,4-pentanediol, and 1,6-hexanediol.

When in Example I the following fatty acids are substituted, either wholly or in part (e.g., a 1:1 ratio) for the octanoic acid on an equal molar basis, substantially equivalent results are obtained in that polyester plasticizers are prepared which have improved low temperature properties and good permanence properties when used in the polyvinyl chloride resin of Example I at a level of 60 parts per hundred of resin: acetic acid, propionic acid, butyric acid, valeric acid, caproic acid, caprylic acid, lauric acid, myristic acid, palmitic acid and stearic acid.

EXAMPLE VI

In a sixth method of preparing the polyester plasticizer, 4 moles of adipic acid are reacted with two moles of the glycidyl ether of Example II and .6 mole of octanol in the presence of 1.2 grams of zinc chloride catalyst. This reaction is carried out at about 200° C. for about one-half hour. At this time 1.5 mole of propylene glycol is added and the reaction is continued for about three hours at about 180° C. at atmospheric pressure. At this time the excess adipic acid is removed and the polyester is incorporated into Geon 101 at 60 parts per hundred of resin. The molecular weight is within the range from 800 to 4000.

When, in the above example, the following alcohols are substituted either wholly or in part (e.g., a 1:1 ratio) for the octanol on an equal molar basis, substantially equivalent results are obtained in that polyester plasticizers are prepared which have improved low temperature properties and good permanence properties when used in the polyvinyl chloride resin of Example I at a level of 50 parts per 100 of resin: ethanol, butanol, hexanol, heptanol, octanol, nonanol, decanol, dodecanol, tetradecanol, hexadecanol, octadecanol, and eicosanol.

What is claimed is:

1. A polyester having a molecular weight of from about 800 to about 4,000 which is a reaction product of (1) a dibasic acid having from 6 to 13 carbon atoms, (2) a diol comprising (a) from about 10 to about 100 mole percent of an epoxide compound having the formula

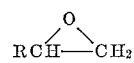

wherein R is selected from the group consisting of alkyl groups containing from 4 to 16 carbon atoms and groups having the formula R'—O—CH₂— wherein R' is selected from the group consisting of alkyl and acyl groups containing from 4 to 16 carbon atoms and any remainder comprising (b) an aliphatic dihydroxy alcohol having from 2 to 6 carbon atoms and (3) a terminator selected from the group consisting of fatty acids and fatty alcohols containing from 2 to 22 carbon atoms, there being up to about 150 mole percent excess of either component (1) or component (2) over the amount required for the reaction and at least a stoichiometric amount of the terminator which is an alcohol when excess dibasic acid is used and a fatty acid when excess diol is used.

2. The polyester of claim 1 wherein the dibasic acid is adipic acid.

3. The polyester of claim 1 wherein the aliphatic dihydroxy alcohol is propylene glycol.

4. The polyester of claim 1 wherein the dibasic acid is adipic acid and the aliphatic dihydroxy alcohol is propylene glycol.

5. The polyester of claim 1 wherein the dibasic acid has from 6 to 9 carbon atoms and wherein R is an alkyl group containing from 10 to 16 carbon atoms and wherein the epoxide compound (a) is from about 20 to about 50 mole percent of the diol.

6. The polyester of claim 1 wherein R has the formula R'—O—CH$_2$— wherein R' is selected from the group consisting of alkyl and acyl groups containing from 8 to 14 carbon atoms.

7. The polyester of claim 6 wherein R' is an alkyl group.

8. A plasticized polymer of vinyl chloride which comprises a polymer of vinyl chloride and the polyester plasticizer of claim 1.

9. The plasticized vinyl chloride polymer composition of claim 8 wherein the polyester ranges from about 35 to about 70 parts per hundred parts of polyvinyl chloride.

10. The plasticized vinyl chloride polymer composition of claim 9 wherein the polyester is that of claim 2.

11. The plasticized vinyl chloride polymer composition of claim 9 wherein the polyester is that of claim 3.

12. The plasticized vinyl chloride polymer composition of claim 9 wherein the polyester is that of claim 4.

13. The plasticized vinyl chloride polymer composition of claim 12 wherein the alkyl glycidyl ether has an alkyl group ranging in chain lengths from 8 to 10 carbon atoms.

References Cited

UNITED STATES PATENTS

| | | | |
|---|---|---|---|
| 3,268,483 | 8/1966 | Klootwijk et al. | 260—75 |
| 3,055,869 | 9/1962 | Wilson et al. | 260—75 |
| 3,086,949 | 4/1963 | Chatfield | 260—22 |
| 3,091,597 | 5/1963 | Henriques | 260—31.4 |
| 3,268,462 | 8/1966 | Bruin et al. | 260—22 |
| 3,275,584 | 9/1966 | Kraft et al. | 260—23 |
| 3,284,375 | 11/1966 | Shokal | 260—22 |
| 3,330,789 | 7/1967 | Aylesworth et al. | 260—22 |
| 3,397,255 | 8/1968 | Coats et al. | 260—850 |

FOREIGN PATENTS 2,099,863  10/1963  Japan.

DONALD E. CZAJA, Primary Examiner

R. W. GRIFFIN, Assistant Examiner

U.S. Cl. X.R.

117—128.4, 161; 260—23, 31.4, 77

PO-1050
(5/69)

UNITED STATES PATENT OFFICE
CERTIFICATE OF CORRECTION

Patent No. 3,533,974  Dated October 13, 1970

Inventor(s) Edmund Paul Pultinas, Jr.

It is certified that error appears in the above-identified patent and that said Letters Patent are hereby corrected as shown below:

Column 1, line 60, after "(1)" and before "dibasic" should read --a--.

Column 2, line 36, "a" should read --at--.

Column 2, line 44, "repreesnt" should read --represents--.

Column 3, line 8, "$C_6$" should read --$C_{16}$--.

Column 3, line 15, "$C_8$" should read --$C_{18}$--.

Column 3, line 33, "amounts" should read --amount--.

Column 4, line 16, "steari" should read --stearic--.

Column 4, line 56, "procedure" should read --procedures--.

Column 6, line 32, "compostions" should read --compositions--.

Column 6, line 55, "refrerred" should read --referred--.

Column 6, line 56, "referes" should read --refers--.

Column 6, line 62, "comparsion" should read --comparison--.

Column 7, line 18, "showes" should read --shows--.

Column 7, line 30, "pedant" should read --pendant--.

Column 7, line 51, "ortylene" should read --octylene--.

Signed and sealed this 22nd day of December 1970.

(SEAL)
Attest:

Edward M. Fletcher, Jr.
Attesting Officer

WILLIAM E. SCHUYLER, JR.
Commissioner of Patents